United States Patent [19]

Gillespie

[11] 4,337,648

[45] Jul. 6, 1982

[54] DUAL PROBE COUPLER

[75] Inventor: John W. Gillespie, Chelsea, Mich.

[73] Assignee: Jodon Engineering Associates, Inc., Ann Arbor, Mich.

[21] Appl. No.: 203,631

[22] Filed: Nov. 3, 1980

[51] Int. Cl.³ .......................................... G01M 15/00
[52] U.S. Cl. .................................. 73/117.3; 73/119 A
[58] Field of Search .................. 73/116, 119 A, 117.3; 324/58.5 R, 58.5 B, 58.5 C; 333/99 R; 350/96.1

[56] References Cited

U.S. PATENT DOCUMENTS 3,678,741  7/1972  Burley .................................... 73/116
3,703,825 11/1972  Merlo ..................................... 73/116

Primary Examiner—Jerry W. Myracle
Attorney, Agent, or Firm—Barnes, Kisselle, Raisch & Choate

[57] ABSTRACT

A probe assembly for injection of microwave energy into the cylinder cavity of a diesel engine and detection of luminescence indicative of fuel ignition in the cylinder. The probe assembly comprises a probe with microwave and optical transmitters extending axially therethrough adapted to be threaded into a cylinder opening. A coupler is removably mounted on the probe and includes an optical detector mounted in assembly coaxially with the optical transmitter in the probe and a microwave antenna coupled by a waveguide cavity within the coupler to the probe microwave transmitter. The coupler is adapted for connection to suitable external diagnostic circuitry for providing to such circuitry signals indicative of piston position within the cylinder and fuel ignition as a function of the microwave and luminescence signals respectively.

8 Claims, 6 Drawing Figures

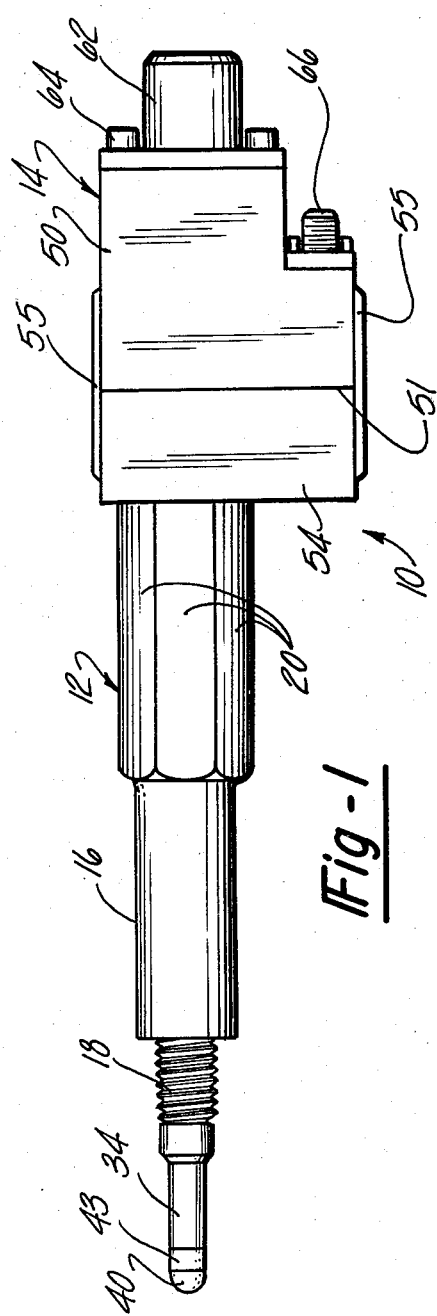
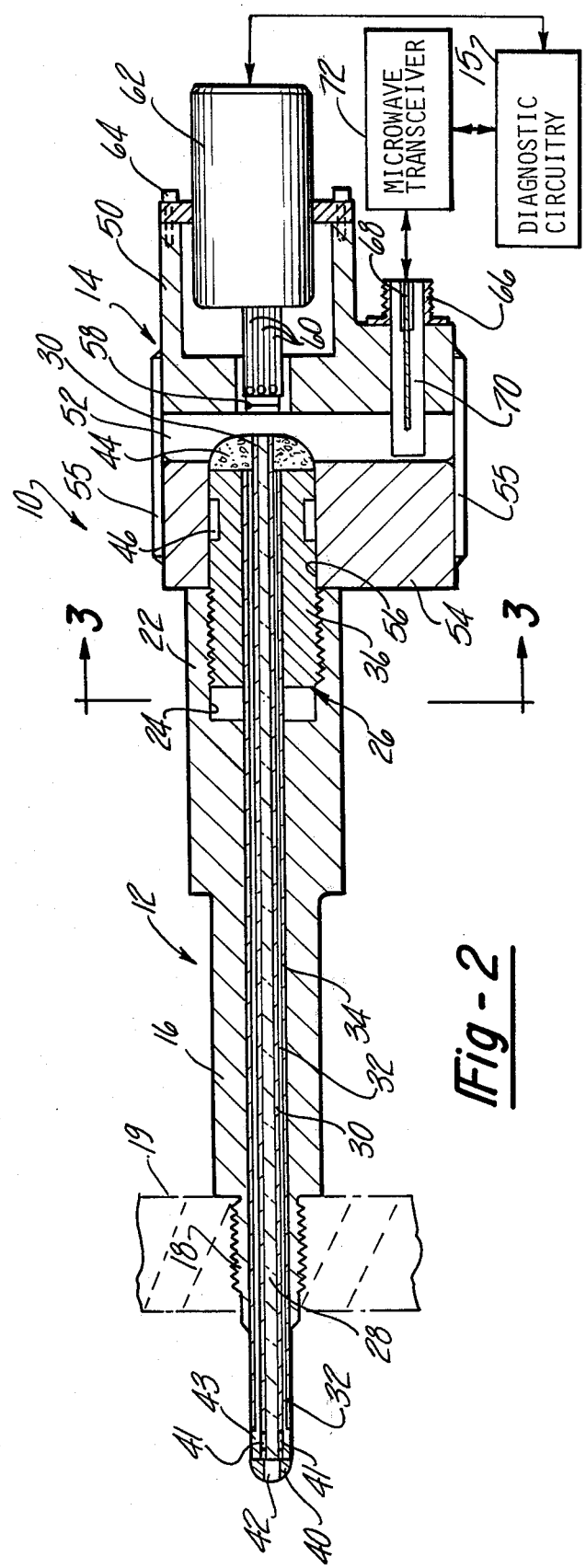

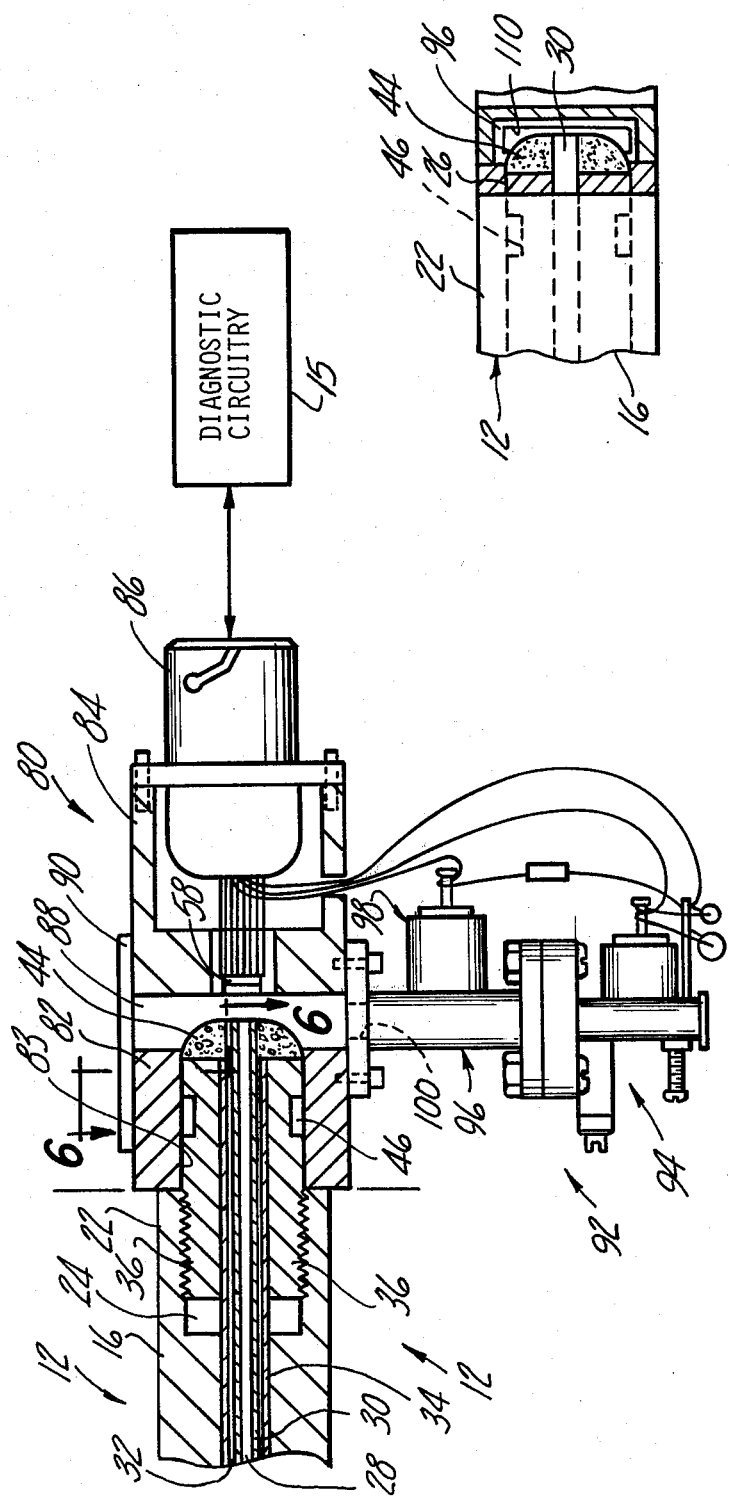

DUAL PROBE COUPLER

The present invention relates to measuring and testing of ignition timing in an internal combustion engine, and more particularly to probes for monitoring significant timing events, specifically piston position and fuel ignition, in a diesel engine.

Monitoring and diagnosis events within the combustion chamber of an internal combustion engine are assuming increasing and even critical importance with increased emphasis on fuel economy and emissions control. The U.S. Pat. Nos. to Merlo 3,589,177 and 3,703,825 disclose apparatus for separately monitoring and interrelating fuel ignition to piston position in a gasoline engine. Piston position is monitored by coupling a source of microwave energy to an engine spark plug through an adapter and detecting microwave resonance events during engine operation. The time of occurrence of fuel ignition is determined indirectly by detecting within the adapter transmission of spark energy to the spark plug.

It has heretofore been proposed to adapt gasoline engine timing techniques of the type shown in the Merlo patents to diesel engines by injecting microwave signals into the engine cylinder through a probe mounted in the cylinder glow plug opening, or in the case of direct injection diesel engine designs, through a special part in the main cylinder. The prior art probes of this type further include optical transmission means, such as an optical fiber, for providing an indication of fuel ignition to external diagnostic circuitry by directing combustion luminescence from the ignition cavity onto a photodetector.

A problem which has existed in such dual optical and microwave probes for diesel engines as previously proposed lies in the fact that the photodetector, and the electrical connections between the photodetector and microwave transmitter in the probe and cables connecting the same to external diagnostic circuitry, may be damaged or broken during installation of the probe into an engine, particularly in a service environment where the engine is installed in a vehicle. When the interconnection cables are left connected to the probe, they tend to become entangled with other hardware as the probe is threaded into the selected glow plug opening. On the other hand, if the cables are disconnected during the probe-insertion process, it is sometimes difficult to reattach the cables, and invariably deleterious wear occurs, especially with respect to the microwave connector.

An object of the present invention is to provide a coupler, and a probe assembly which includes such coupler, which may be readily attached to a dual probe of the described type after the probe has been assembled to an engine. In furtherance of the above, another and more specific object of the invention is to provide a probe assembly in which the coupler may be readily assembled to the probe after the probe has been installed onto an engine, and which is adapted to operate independently of coupler orientation with respect to the probe.

The invention, together with additional objects, features and advantages thereof, will be best understood from the following description, the appended claims and the accompanying drawings in which:

FIG. 1 is a side elevational view of a probe assembly in accordance with one presently preferred embodiment of the invention;

FIG. 2 is a side sectional view of the probe illustrated in FIG. 1 on a somewhat enlarged scale;

FIG. 5 is a fragmentary side sectional view of a coupler and probe assembly in accordance with a modified embodiment of the invention; and FIG. 6 is a sectional view taken along the line 6—6 in FIG. 5.

Figure 3:
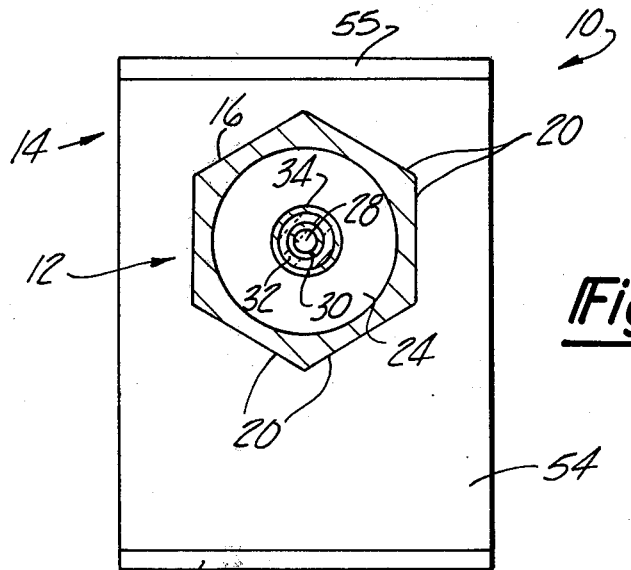
FIG. 3 is a sectional view taken along the line 3—3 in FIG. 2.
Figure 4:
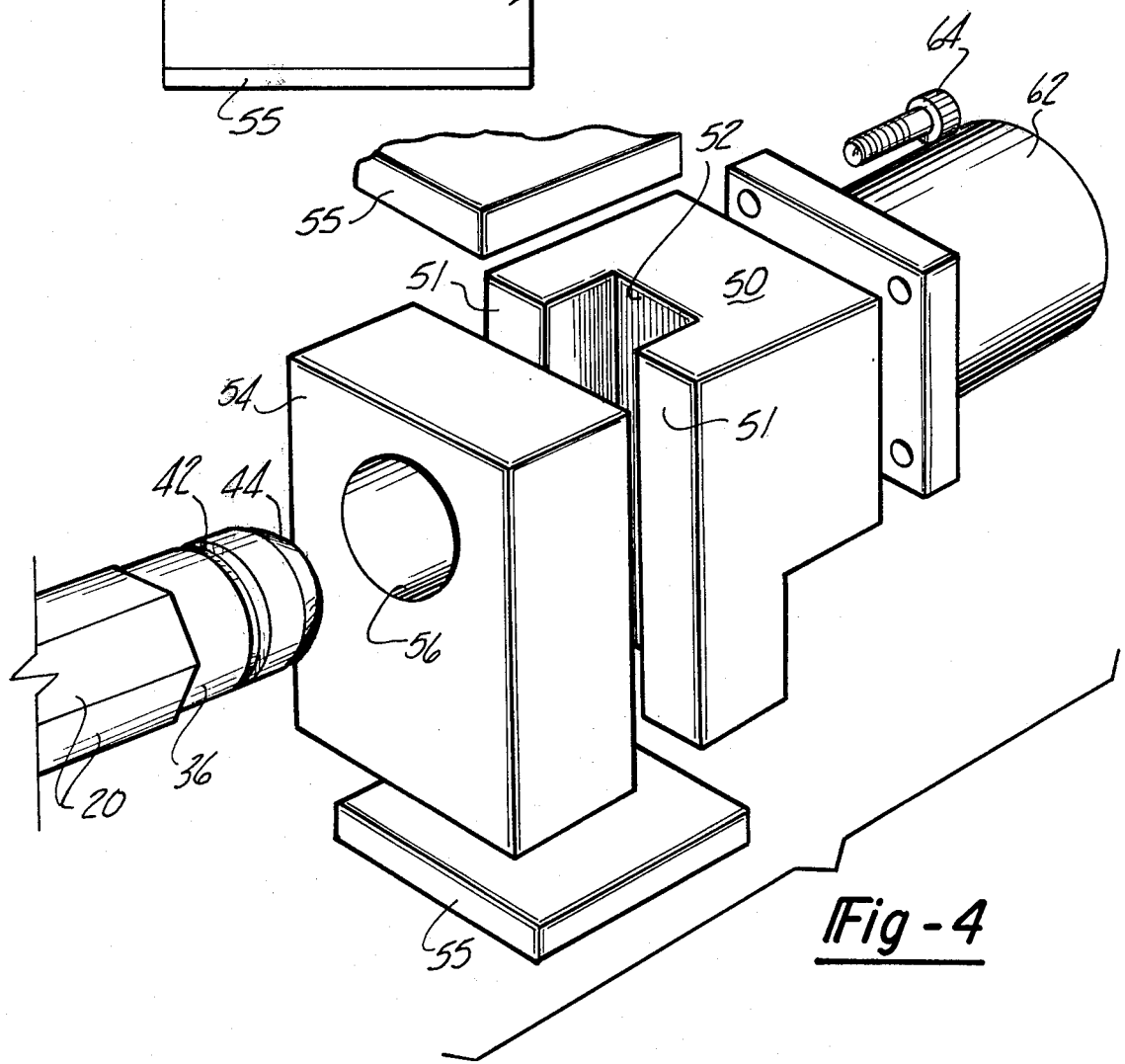
FIG. 4 is a fragmentary, partially exploded perspective view of the coupler portion of the probe assembly shown in FIGS. 1-3.

FIGS. 1-4 illustrate one embodiment of a probe and coupler assembly 10 in accordance with the invention as comprising a dual probe 12, i.e. a probe for transmission of both microwave and optical energy as previously described, and a coupler 14 for connecting probe 12 to external diagnostic circuitry 15 (FIG. 2). Such circuitry may take any number of forms, of which those shown in the above-noted Merlo patents are two examples, the disclosures of such patents being incorporated herein by reference. Probe 12 comprises a generally tubular body 16 having external threads machined at one end 18 suitable for threading the probe into a cylinder opening of an internal combustion engine 19 (FIG. 2). In the particularly preferred application of the invention to diesel engines, threaded end 18 may advantageously be adapted for insertion into the glow plug opening of a selected engine cylinder or cylinder swirl chamber (with glow plug removed). The probe might also be held in without threads using an air cylinder sealing by an elastomeric collar, etc. At least a portion of the outer surface of tubular body 16 is provided with machined axially oriented flats 20 in a hexagonal pattern (FIGS. 1 and 3) to receive a wrench or the like for tightening the probe in the cylinder opening so as to prevent escape of combustion gases, etc. The second end 22 of probe body 16 is provided with an internally threaded bore 24 (FIG. 2) coaxial with the central axis of body 16 and into which is threaded an energy transmission subassembly 26.

As best appreciated with reference to FIGS. 2 and 3, subassembly 26 comprises an optical fiber 28 coaxial with probe body 16 and telescopically received into a hollow tubular metal microwave conductor 30. Conductor 30 is surrounded by a coaxial insulator 32 which is preferably constructed of optically transparent material so as to cooperate with fiber 28 for transmission of combustion luminescence. Insulator 32 is telescopically received in an outer sheath 34. The subassembly of fiber 28 through sheath 34 is received at one end into a plug 36 which is threaded into bore 24 of probe body 16 such that the telescoped assembly projects coaxially from end 18 of body 16. Insulator 32, microwave conductor 30 and optical fiber 28 project axially from both ends of outer sheath 34.

Adjacent the threaded end 18 of probe body 16, a plug 40 is adhered over the coplanar ends of fiber 28, conductor 30 and insulator 32, plug 40 having a central opening 42 for transmitting light energy to fiber 28. Light energy from combustion luminescence similarly impinges radially on insulator 32 through the annular window 43 between plug 40 and the inner end of sheath 34. Diametrically opposed slotted openings 41 are formed in conductor 30 radially inwardly of window 43 for admitting a portion of the light energy received therethrough onto fiber 28. Similarly, fiber 28, conductor 30 and insulator 32 project from the outer end of plug 36, while sheath 34 terminates coplanar therewith and is sealed thereto by the epoxy layer 44. The radially facing surface of that portion of plug 36 projecting axially from probe body 16 is cylindrical coaxially with probe body 16 and is provided with a circumferential channel 46 which operates as a microwave choke.

In accordance with the invention, coupler 14 is telescopically received over plug 36 for coupling microwave energy to conductor 30 and detecting transmission of optical energy by fiber 28 and/or insulator 32. Coupler 14 comprises a hollow body including a connector mounting block 50 having a rectangular channel 52 (FIGS. 2 and 4) extending laterally along one face 51 thereof. A plate 54 is rigidly mounted to block 50 against face 51 by the side plates 55 so as to close channel 52 and thereby form, in cooperation with side plates 55, a laterally extending rectangular microwave cavity or waveguide. A cylindrical bore 56 extends through plate 54 and opens into cavity 52 for mounting coupler 14 over the cylindrical outer surface of plug 26 such that fiber 28, microwave conductor 30 and insulator 32 project longitudinally and axially into cavity 52, as best seen in FIG. 2.

A photodetector 58 is mounted on block 50 at a position along the bottom wall of cavity 52 coaxial with bore 56 in plate 54 so as to be aligned axially with optical fiber 28 and insulator 32 in assembly of coupler 14 with probe 12. Electrical chips and components may be potted into a module (not shown) attached to connector 62 to precondition (i.e., shape and amplify) the illuminance signal. Leads 60 electrically connect photodetector 58 to a connector 62 which is mounted by the screws 64 on an external surface of block 50 for electrically connecting photodetector 58 to external diagnostic circuitry 55. A SMA-type coax connector 66 is similarly mounted on block 50 at a position laterally spaced from the axis of bore 56 and probe 12. Connector 66 includes an elongated conductor 68 surrounded by an insulator 70 which project through block 50 into cavity 52 on an axis parallel with the axis of bore 56 and probe 12, and laterally spaced therefrom in assembly, as best seen in FIG. 2. The connector 66 is adapted to receive the usual coax type connector and cable for connecting conductor 68 to a microwave transceiver 72, and thence to diagnostic circuitry 15. Transceiver 72 may comprise a Microwave Associates oscillator MA-86210-MO5, a Microwave Associater Circulator MA-8K220, an Omnispectra coax adapter 2000-6255 and a Hewlett-Packard crystal detector P424A.

In operation, probe 12, is first threaded into the glow plug opening of a selected cylinder as previously described, and coupler 14 with cables attached thereto is then telescopically and slidably engaged over plug 26 against the axial end of body 16. In such position, with photodetector 58 aligned axially with fiber 28 and insulator 32, the detector is in a position to be responsive to light energy indicative of fuel ignition in the selected cylinder transmitted through fiber 28 and insulator 32. Microwave energy from transceiver 72 is coupled laterally through cavity 52 to conductor 30 projecting into cavity 52, and thence along conductor 30, which operates as a microwave transmission line, into the cylinder caivty. Within the cylinder cavity, the microwave energy is radiated laterally from conductor 30 through the annular window 43 between plug 40 and outer sheath 34, window 43 being preferably about one-half wavelength in axial dimension. Microwave conductor 30 projects about one-quarter wavelength beyond protective sheath 34 into cavity 52. Bore 56 in plate 54 is preferably dimensioned for close sliding fit over the cylindrical outer surface of plug 36. Channel 46, which is preferably one-half wavelength in axial dimension, reduces leakage of microwave energy between plate 54 and plug 36.

Thus, it will be appreciated that the embodiment of the invention thus far described in connection with FIGS. 1–4 fully satisfies all of the objects and aims previously set forth. In particular, probe 12, which is relatively rugged, may be inserted using suitable tools into the cylinder opening. Coupler 14, which includes relatively more delicate components, and also the cable interconnections to remote diagnostic circuitry, may then be telescoped over plug 26 of probe 12 after the probe is fully installed onto the engine. It should be noted in particular that positioning of photodetector 56 coaxially with bore 56, and therefore with probe 12 in assembly, in cooperation with waveguide cavity 52 and placement of microwave antenna conductor 68 laterally of the axis of bore 56, allows the probe/coupler interface to operate independently of the angular orientation of coupler 14 with respect to the axis of probe 12. Opening 56 and the corresponding surface plug 36 are preferably cylindrical as described, although other symmetrical (polygonal) geometries are envisioned.

FIGS. 5 and 6 illustrate a modified embodiment of the invention wherein identical reference numerals illustrate elements identical to those in the embodiment previously described in detail. The modified coupler 80 illustrated in FIGS. 5 and 6 differs from the coupler 14 previously described primarily in that the microwave energy source and detector, i.e. the microwave transceiver 72 in FIG. 2, is mounted on the coupler. More particularly, coupler 80 includes a mounting plate 82 having a base 83 for telescopic engagement with plug 36 of probe 12, and a connector block 84 with photodetector 58 and a connector 86 mounted thereon. A laterally or radially extending channel 88 in connector block 84 cooperates with mounting plate 82 and the side plates 90 in the manner previously described for forming a microwave waveguide cavity. A microwave transceiver generally indicated at 92 is mounted on coupler 80 and includes an oscillator 94 and a circulator 96 having a suitable detector 98 mounted thereon. As best seen in FIG. 6, circulator 96 has a generally rectangular mouth 100 which opens onto cavity 88 for transmission of microwave energy from oscillator 94 to microwave conductor 30, and from conductor 30 to detector 98. Oscillator 94 and detector 98 are connected by suitable leads to connector 86, and thence to external diagnostic circuitry 15. The modified embodiment of FIGS. 5 and 6 thus requires only one cable connection between the probe and coupler assembly and the diagnostic circuitry. Transceiver 92 may comprise a model MA-86857-MO1 marketed by Microwave Associates. Operation of the embodiment of FIGS. 5 and 6 will be self-evident from the foregoing discussion.

The invention claimed is:

1. A coupler for use with a microwave/luminescence probe for detecting timing events in an internal combustion engine and comprising a body adapted to be received at one end into a cylinder opening and having a second end with a central axis, microwave transmission means extending through said body and projecting from a said second end of said body for receiving microwave signals for injection into said cylinder, and optical transmission means extending through said body and terminating at said second end coaxially with said central axis for conducting and transmitting axially of said second end luminescence indicative of ignition at said cylinder, said coupler being adapted for connecting said microwave and optical transmission means to diagnostic circuitry and having an opening adapted to be removable received coaxially over said second end and a microwave cavity extending from said opening laterally of said opening axis internally of said coupler, said microwave transmission means projecting into said cavity and said optical transmission means terminating within said cavity when said coupler is received over said second end of said body, a source of microwave radiation carried by said coupler and communicating with said cavity laterally of said opening axis for transmitting microwave energy through said cavity to said microwave transmission means, optical detection means carried by coupler across said cavity from said opening and coaxially with said opening so as to be aligned with said optical transmission means when said coupler is received over said second end of said body, such that said optical detection is aligned with said optical transmission means and said source communicates through said cavity with said microwave transmission means independently of angular orientation of said coupler and said source with respect to said body and said microwave transmission means, and means for electrically connecting said source and said optical detection means to diagnostic circuitry.

2. The combination set forth in claim 1 wherein said opening in said coupler is adapted to be slidably received on said body axially of said second end.

3. The combination set forth in claim 1 or 2 wherein said means for electrically connecting comprises coaxial connection means, and wherein said source comprises a microwave antenna projecting from said connection means into said cavity on an axis parallel to the axis of said opening.

4. The combination set forth in claim 1 or 2 wherein said microwave means comprises microwave oscillator and detection means carried by said first means in open communication with said cavity.

5. The combination set forth in claim 4 wherein said microwave oscillator and detection means comprises a microwave oscillator, a microwave detector and a circulator coupling said oscillator and said detector to said cavity.

6. A probe assembly for detecting timing events in an internal combustion engine comprising a probe including a body having means at one end adapted to be received into an engine cylinder opening and a second end, microwave transmission means extending through said body and projecting from said first and second ends of said body for injecting microwave signals into an engine cylinder and optical transmission means extending through said body for transmitting luminescence indicative of fuel ignition in said cylinder to said second end of said body, and a coupler for connecting said microwave and optical transmission means to diagnostic circuitry comprising a housing having an opening adapted to be removably received over said second end of said body and a microwave cavity communicating with and extending laterally from said opening with said housing, said portion of said microwave transmission means projecting into said cavity and said optical transmission means terminating within said cavity when said housing is received over said second end of said body, microwave means carried by said body and communicating with said cavity laterally of said opening for transmitting microwave signals through said cavity to said portion of said microwave transmission means projecting into said cavity, and optical detection means carried by said housing and communicating with said cavity axially of said opening for receiving said luminescence indicative of fuel ignition.

7. For use in a probe assembly for detecting timing events in an internal combustion engine and comprising a probe adapted to transmit microwave and optical energy to and from an engine cylinder and a coupler adapted to be removably received onto said probe for transducing said microwave and optical energies into electrical signals, the improved probe comprising a body having means at one end adapted to be received into an engine cylinder and a second end, microwave transmission means extending entirely through said body and projecting from said first and second ends of said body, and optical transmission means extending entirely through said body coaxially with said microwave transmission means, said microwave transmission means and said optical transmission means being telescopically received one within the other entirely through said body, said second end of said body having an external surface adapted telescopically to receive said coupler in a plurality of angular orientations with respect to the axis of said microwave transmission means, said optical transmission means and said body.

8. The improved probe set forth in claim 7 wherein said microwave transmission means and said optical transmission telescopically extend coaxially and centrally through said body, and wherein said external surface at said second end of said body is cylindrical coaxially with said body for receiving said coupler at any angle with respect to said body.

* * * * *